No. 718,736. PATENTED JAN. 20, 1903.
G. A. SOMMER.
PHOTOGRAPHIC SHUTTER OPERATING MECHANISM.
APPLICATION FILED AUG. 18, 1902.
NO MODEL.
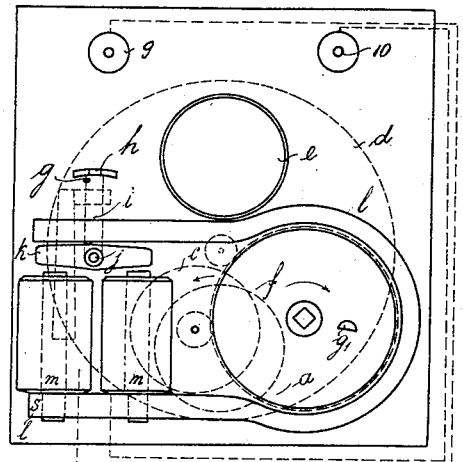
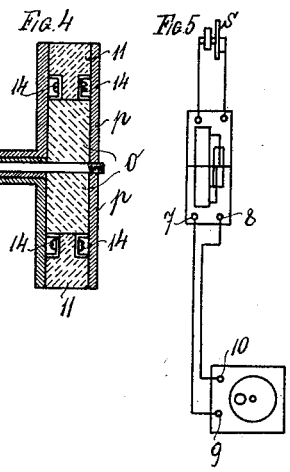
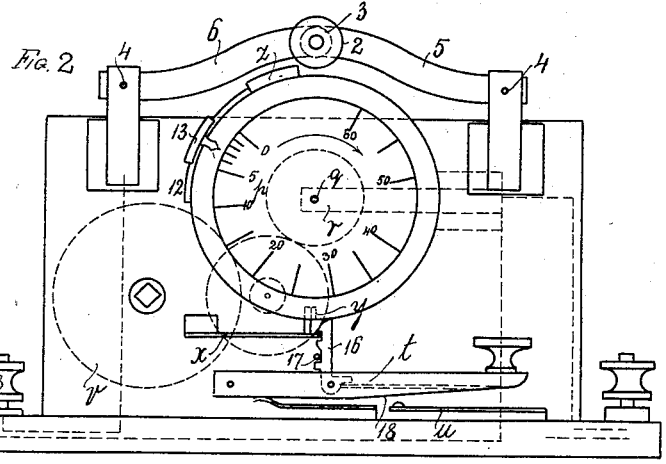
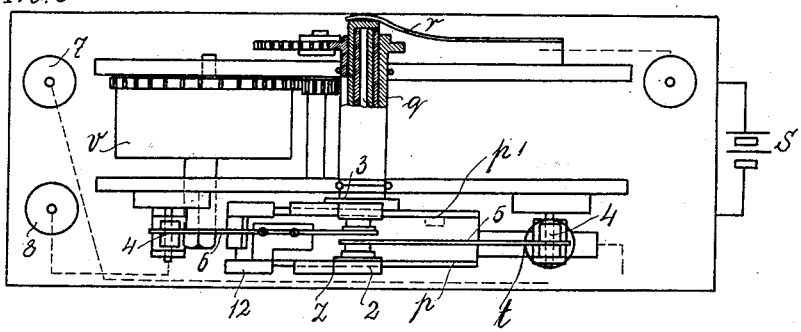
Witnesses:
Inventor.

UNITED STATES PATENT OFFICE.

GUSTAV ADOLPH SOMMER, OF VIENNA, AUSTRIA-HUNGARY.

PHOTOGRAPHIC-SHUTTER-OPERATING MECHANISM.

SPECIFICATION forming part of Letters Patent No. 718,736, dated January 20, 1903.

Application filed August 18, 1902. Serial No. 120,102. (No model.)

*To all whom it may concern:*

Be it known that I, GUSTAV ADOLPH SOMMER, manufacturer, a subject of the Emperor of Austria-Hungary, residing at 6 Laxenburgerstrasse, Vienna X, in the Empire of Austria-Hungary, have invented certain new and useful Improvements in Photographic-Shutter-Operating Mechanism, of which the following is a specification.

My invention relates to shutters for photographic cameras, and has for its particular object to provide means for the electromagnetical operation of the shutter of the objective or photographic lens for the purpose of timing the shutter accurately and for setting the same for any desired time exposure for repetition work.

In electrically-operated shutters as heretofore constructed the rotary shutter with its exposure-orifice is either started or stopped by the armature-lever of an electromagnet or by means of a spring-controlled tapping-lever. The objection to this arrangement is that the rotary shutter is temporarily retained in its open position after the current has been interrupted and this owing to the residual magnetism of the electromagnet-cores. Thus the exposure is prolonged beyond the proper time. This objection is avoided according to my invention by combining the arm carrying the stops for the tappet-pins of the rotary shutter with the polarized arm of a permanent magnet, which arm has free play between the two poles of a bifurcated electromagnet and which changes its position only at the reversion of the current by means of a suitable interrupter or other known appliance. I have found it advantageous to utilize for this purpose a commutator operated by clockwork and adapted to be set for varying time exposures between the two opposite coils in such a manner as to enable the operator to work subsequently with exactly the same time exposure without being required to devote special attention thereto in the manner of ever-set time-shutters.

My invention is illustrated in the accompanying drawings, in which—

Figure 1 is an internal view of the improved shutter mechanism. Figs. 2 and 3 are an elevation and a plan, partly in section, of the commutator driven by clockwork. Fig. 4 is a horizontal section of a detail of the commutator, and Fig. 5 is a diagram showing the complete arrangement.

$a$ is a spring-case for operating the shutter $d$ by means of intermediate gear $b\ c$. The shutter is formed with an aperture $f$ for exposing the lens $e$ and is provided with two small studs or pins $g\ g$, located at one hundred and ninety degrees from each other. These pins act upon an oscillating escapement $h$, similarly to that described in Eders' book on photography, and retain the shutter in its open and closed position, respectively. The escapement is mounted on an arm $i$ of the armature-lever $k$, which latter is fulcrumed at $j$ in front of the electromagnet $m$ $m$ and is polarized by a permanent magnet $l$. A brake-spring $n$ prevents the pins $g\ g'$ from striking the escapement $h$ with a too-sudden jerk. The armature-lever $k$ is shown in the position it will assume by reason of a current that converts the right-hand core of the electromagnet into a south pole, its position only altering at the reversing of the current and remaining unaffected both by the continuous passage and the interruption of the current. The operation of this shutter can be effected through the intervention of any device that will produce alternate current impulses or phases. The arrangement shown in Figs. 2 and 4 is very convenient for the purpose of automatically reversing the current and permitting any desired time exposure to be adopted. This automatic commutator consists of two metallic disks $p$ and $p'$, insulated from one another by a disk $o$, Fig. 4. The disk $p$ is connected by the pin $q$ and contact-spring $r$ with one pole of a battery $s$, and the disk $p'$ is connected with the contact-key $t$, which by its contact with a spring $u$ completes the circuit with the other pole of the battery. These disks $v\ p\ p'$ receive motion from a spring-casing $v'$, regulated for speed by a flier or an escapement or any other appropriate means and are normally kept quiet by reason of a stop-pin $y$ contacting with a pin $w$ of the spring $x$. (See Fig. 2.) The disks $p\ p'$ are each provided with a contact-piece $z$, adapted to be brought into contact with a contact-roll 2 and 3, respectively. These contact-rolls are carried by arms 5 and 6, pivoted at 4, respectively, said arms being electrically connected with the binding-screws 7 and 8, which, by means of conducting-wires, lead to binding-screws 9 and 10 for the shutter. (See Figs. 1 and 5.) The disks $p$ $p'$ have between them a ring 11, adapted to be rotated and carrying on its outer periphery two contact-pieces 12 and 13, arranged to contact with the aforementioned contact-rolls 2 and 3, respectively. The contact 12 is electrically connected, by flat springs 14, with the disk $p'$, and contact 13 is similarly connected with the disk $p$. The ring 11, with its contacts 12 13, can be moved with its index-pointer 15 over a time-scale, (indicated on the disk $p$,) so as to set the shutter for any desired time exposure. By depressing the key $t$ circuit is made at $u$ with the battery and disk $p'$, while at the same time the spring-arm 16 pulls the pin $w$ downward, so as to release the disks $p$ $p'$ and allow them to turn. During the downstroke of the arm 16 a stationary stud 17 forces said arm back to the right against the tension of a spring 18, so that the spring $x$ is released, and thereby brings the pin $w$ again into the path of the pin $y$ for arresting the disks $p$ $p'$ after one revolution. The passage of the contacts $z$ under the rolls 2 3 cause the electromagnets $m$ $m$ to produce a sudden current impulse which will effect the opening of the rotary shutter. The shutter remains in this position till the contacts 12 13 come against the rolls 2 and 3, and thereby produce a current impulse in the opposite direction to the first impulse and so effect the closing of the shutter. By releasing the key $t$ the arm 16 will again engage the spring $x$, whereby the parts are returned to the position for another reversion of the current. In this manner each depression of the key $t$ corresponds to an exposure.

In lieu of the foregoing simple commutator a form of commutator may be employed on the periphery of which are provided several contacts, so as to arrange either for several successive exposures or simultaneous exposures, as may be most desirable.

Hand-cameras can be fitted with a smaller commutator and the key $t$ can be replaced by a small electromagnet fitted with a simple operating-lever for starting the current. Again, a single transmitting-key or commutator can be arranged for simultaneously operating several shutters by connecting them either in parallel or in series, and thus permit several cameras mounted in different positions to be simultaneously operated.

What I claim as my invention, and desire to secure by Letters Patent of the United States, is—

1. In an electromagnetically-operated lens-shutter for photographic cameras, the combination with a rotary shutter driven by clockwork and retained either in its open, or its closed position by an escapement connected with the armature of the electromagnet, of a polarized armature-lever rigidly fixed to said escapement and retained in one position or the other in accordance with the direction of the current impulses.

2. In a lens-shutter of the character herein described, the combination with a rotary shutter, clockwork driving the shutter, an escapement for retaining the shutter, an armature and electromagnet connected with said escapement, of means for automatically giving successive alternating-current impulses at predetermined intervals, as and for the purpose described.

3. In a lens-shutter of the character herein described, the combination with means for rotating the shutter through the action of an electromagnetic escapement operated by alternating impulses of an electric current, of two insulated disks contact-pieces carried by said disks and forming opposite poles, contact-rolls to contact with said disks and electrically connected to the binding-posts of the closing device so as to transmit the impulses of said device through an electromagnet, two further insulated movable contacts electrically connected in reversed order with the said disks and adjustably mounted thereon, and a scale on said disks for setting said movable contacts for any predetermined time exposure, substantially as described and shown and for the purpose stated.

In testimony whereof I have signed my name to this application in the presence of two subscribing witnesses.

GUSTAV ADOLPH SOMMER.

Witnesses:
ALVESTO S. HOGUE,
KARL HONIGMANN.